US009596396B2

(12) United States Patent
Yao

(10) Patent No.: US 9,596,396 B2
(45) Date of Patent: Mar. 14, 2017

(54) CAMERA AND CONTROL METHOD THEREOF BASED ON A SENSED TEMPERATURE

(71) Applicant: VIVOTEK INC., New Taipei (TW)

(72) Inventor: Chia-Chi Yao, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 14/837,858

(22) Filed: Aug. 27, 2015

(65) Prior Publication Data

US 2016/0065844 A1    Mar. 3, 2016

(30) Foreign Application Priority Data

Aug. 29, 2014   (TW) .............................. 103129949 A

(51) Int. Cl.
*H04N 5/225* (2006.01)
*H04N 5/232* (2006.01)

(52) U.S. Cl.
CPC ....... *H04N 5/2256* (2013.01); *H04N 5/23241* (2013.01)

(58) Field of Classification Search
CPC .......................... H04N 5/2256; H04N 5/23241
See application file for complete search history.

(56) References Cited

U.S. PATENT DOCUMENTS

| 8,363,158 | B2 * | 1/2013 | Kawano | H04N 1/2112 |
| | | | | 348/372 |
| 8,896,701 | B2 * | 11/2014 | Brown | H04N 5/33 |
| | | | | 348/164 |
| 9,307,145 | B2 * | 4/2016 | Sheng | G03B 17/55 |
| 2008/0022140 | A1 * | 1/2008 | Yamada | G06F 1/206 |
| | | | | 713/322 |
| 2008/0028778 | A1 * | 2/2008 | Millet | G06F 1/206 |
| | | | | 62/129 |
| 2011/0032375 | A1 * | 2/2011 | Kawano | H04N 1/2112 |
| | | | | 348/222.1 |
| 2011/0205367 | A1 * | 8/2011 | Brown | H04N 5/33 |
| | | | | 348/164 |
| 2012/0188287 | A1 * | 7/2012 | Wurzel | G06F 1/203 |
| | | | | 345/690 |
| 2013/0227261 | A1 * | 8/2013 | Anderson | G06F 9/4401 |
| | | | | 713/2 |
| 2015/0062417 | A1 * | 3/2015 | Sheng | G03B 17/55 |
| | | | | 348/372 |

* cited by examiner

*Primary Examiner* — Nicholas Giles
(74) *Attorney, Agent, or Firm* — Maschoff Brennan

(57) ABSTRACT

A camera and a control method thereof are provided. The camera includes a lens, one or more operation units, an image sensor, a thermal sensor, and a control unit. The image sensor is for receiving an image captured by the lens. The thermal sensor is for sensing and outputting the temperature inside the camera. An operation unit performs corresponding action according to an operation power. The control unit is configured to control the magnitude of the operation power of the operation unit(s) so that a monitoring power of the camera is close to but not greater than a default power threshold, and that the sensing temperature is less than or equal to a first default temperature threshold. Wherein, the monitoring power is the sum of the operation power of the operation unit(s). The sensed temperature corresponds to the operation power of the one or more operation units.

12 Claims, 10 Drawing Sheets

CAMERA AND CONTROL METHOD THEREOF BASED ON A SENSED TEMPERATURE

CROSS-REFERENCE TO RELATED APPLICATIONS

This non-provisional application claims priority under 35 U.S.C. §119(a) on Patent Application No. 103129949 filed in Taiwan, R.O.C on Aug. 29, 2014, the entire contents of which are hereby incorporated by reference.

BACKGROUND

Technical Field

The present disclosure relates to a camera and a control method thereof, particularly to a camera and a control method thereof to adjust the operation powers of other operation components of the camera by monitoring the internal temperature of the camera.

Description of the Related Art

A camera does not capture the image because of the darkness of the night or insufficient light. Even when the image is captured, the camera still can not run the monitoring function normally due to the poor image quality resulting from insufficient light.

Therefore, a camera with internal assistant light source is developed to capture clear images through the assistant light source for providing light compensation within the field of view of the camera under the circumstances of insufficient light or in the night, wherein the internal assistant light is provided by, for example, the visible light-emitting diode or the infrared light-emitting diode.

However, when the assistant light source is turned on and heat is generated, so that developing the camera with internal assistant light source must consider that whether the heat generated by the internal assistant light source affects the operation of the internal components of the camera, such as the image sensor, to avoid malfunction of the camera. Therefore, the camera with internal assistant light in the prior art usually limits the operation power of the assistant light to a specific default power to avoid generating too much heat because of the excessive operation power of the assistant light resulting in the malfunction problem. However, the limitation of the camera with internal assistant light in the prior art results in poor light compensation effect and the best operation performance is not achieved.

According to the aforementioned problem, a camera capable of monitoring the internal temperature and a method thereof are needed to enhance the light compensation effect and improve the operation performance of the camera by flexibly adjusting the operation power in a safe temperature.

SUMMARY

A camera includes a lens, at least one operation unit, an image sensor, a thermal sensor, and a control unit. The at least one operation unit actuates according to at least one operation power correspondingly. The image sensor is for receiving images from the lens. The thermal sensor is for performing temperature sensing and outputting a sensing temperature. The control unit is for controlling an amount of the at least one operation power to make a monitoring power owned by the camera close to but not greater than a default power threshold, and to make the sensing temperature not greater than a first default temperature threshold, wherein the monitoring power is the sum of the at least one operation power and the sensing temperature corresponds to the at least one operation power.

A camera control method is for a camera having at least one operation unit. The at least one operation unit actuates according to at least one operation power correspondingly. The camera control method includes performing temperature sensing to the camera to generate a sensing temperature, and controlling an amount of the at least one operation power to make a monitoring power owned by the camera close to but not greater than a default power threshold, and to make the sensing temperature not greater than a first default temperature threshold, wherein the monitoring power is the sum of the at least one operation power and the sensing temperature corresponds to the at least one operation power.

The contents of the present disclosure set forth and the embodiments hereinafter are for demonstrating and illustrating the spirit and principles of the present disclosure, and for providing further explanation of the claims.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
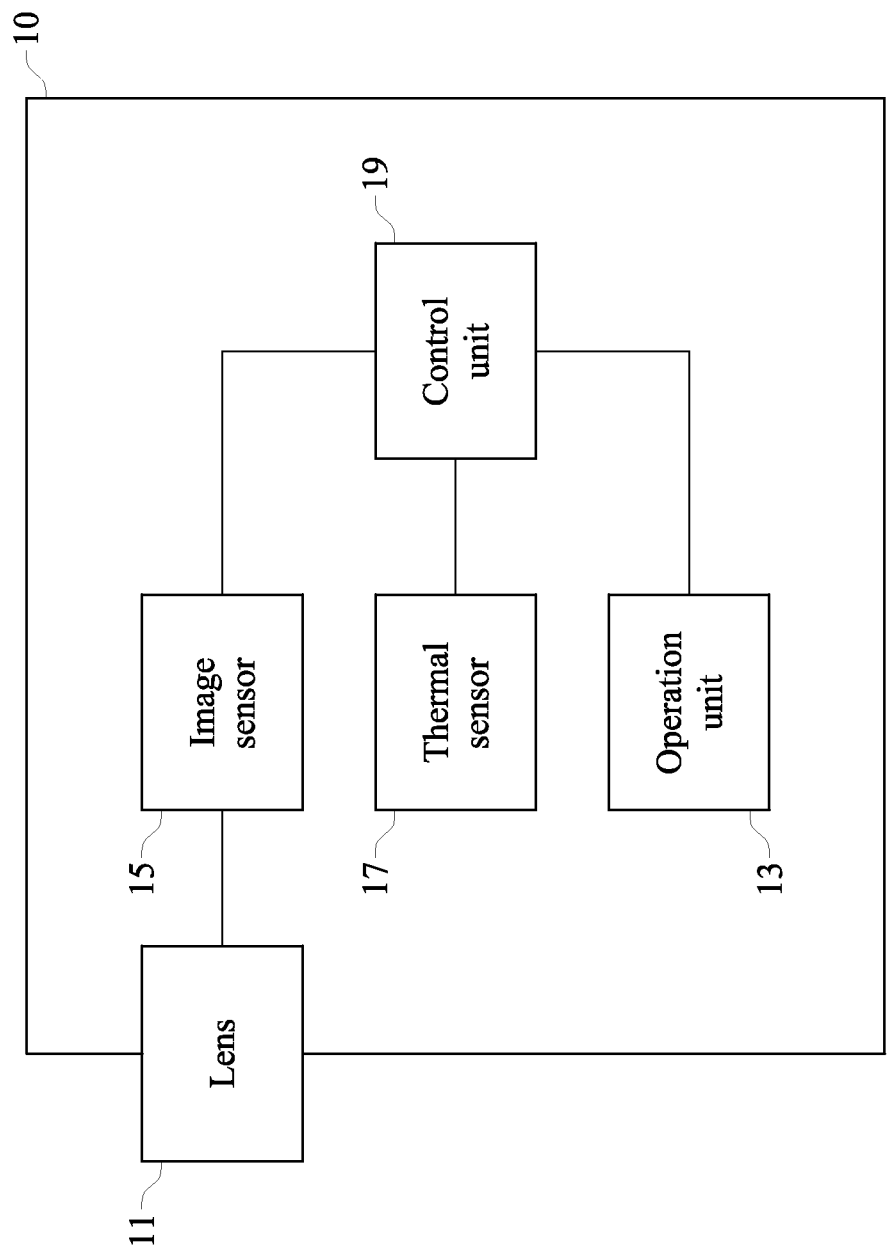
FIG. 1 is a block diagram of the camera according to the first embodiment.
Figure 2:
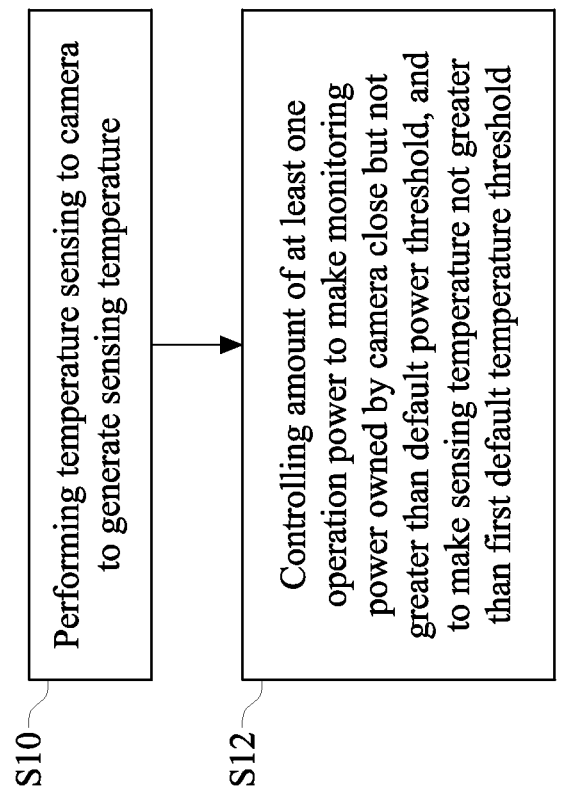
FIG. 2 is a flow chart of the camera control method according to the first embodiment.

Please refer to FIG. 1 and FIG. 2. FIG. 1 is a block diagram of the camera according to the first embodiment. FIG. 2 is a flow chart of the camera control method according to the first embodiment. As shown in the figures, the camera 10 of the present disclosure includes a lens 11, at least one operation unit 13, an image sensor 15, a thermal sensor 17, and a control unit 19. The lens 11 is installed on or outside the case of the camera 10 and is for capturing the light reflected from the objects inside the field of view of the lens. The light is focused in the image sensor 15 through the optical lens of the lens 11. The image sensor 15 captures the light in the lens 11 and generates the image of the objects in the field of view. The image sensor 15 receives the light from the lens 11 stands for receiving the image from the lens 11, and the image indicates the image of the objects in the field of view captured by the lens 11.

In an embodiment, there is a housing space inside the case of the camera 10. The housing space is for being installed with the operation unit 13, the image sensor 15, the thermal sensor 17, and the control unit 19. However, the control unit 19 and the operation unit 13 are not limited to be installed inside the housing space, but there are at least the image sensor 15 and the thermal sensor 17 installed inside the housing space to output the sensing temperature in association with the internal temperature of the camera. More specifically, The thermal sensor 17 is for sensing the temperature variation resulted from the image sensor 15, the operation unit 13, and the control unit 19. Although the position of the thermal sensor 17 is not limited in the present disclosure, the better position of the thermal sensor 17 is close to the image sensor 15 to precisely sense the temperature of the image sensor 15 for controlling the temperature of the housing space, so that the image sensor 15 is protected from malfunction.

The operation unit 13 is, but not limited to, the light-emitting component, the fan, the heater, or a combination of at least two components capable of being combined with the camera 10. Each operation unit 13 correspondingly actuates according to the individual operation power. Taking the light-emitting component for example, the light-emitting component generates the light with different strengths according to different operation powers. Taking the fan for example, the fan operates in different rotation speed according to different operation powers, and the speed and effect of heat dissipation is further different accordingly. Taking the heater for example, the heater also generates different temperature variations according to different operation powers. That the operation unit 13 is the light-emitting component is taken as an example to explain that the corresponding actuation of the operation unit 13 stands for generating different effect according to different amount of operation powers. For example, the light-emitting component is for emitting light towards the field of view of the lens 11 to supply the light for the image sensor 15. When the operation power of the light-emitting component is higher, the light-emitting component emits stronger light correspondingly. When the operation power of the light-emitting component is lower, the light-emitting component emits weaker light correspondingly.

In the step S10, the control method for the camera 10 performs temperature sensing with the thermal sensor 17 to generate the sensing temperature. The sensing temperature is the temperature value obtained by sensing the internal temperature inside the camera 10. For explaining the present disclosure, the image sensor 15, the thermal sensor 17, the operation unit 13, and the control unit 19 are installed in the housing space in the following embodiment. The thermal sensor 17 sensing the temperature variation corresponding to the image sensor 15, the operation unit 13, and the control unit 19. More specifically, the thermal sensor 17 is affected by the operation power of the image sensor 15, the operation power of the operation unit 13, and the operation power of the control unit 19 to generate the sensing temperature.

Next, in the step S12, the control unit 19 controls the amount of the operation power of the operation unit 13 to make the monitoring power of the camera 10 close to but not greater than the default power threshold and make the sensing temperature not greater than the first default temperature threshold.

The monitoring power is the sum of the operation power of the operation unit 13. For example, when the operation unit 13 is the light-emitting component, the monitoring power is the operation power of the light-emitting component. When the operation unit 13 is the combination of the light-emitting component and the fan, the monitoring power is the sum of the operation power of the light-emitting component and the operation power of the fan.

The camera 10 operates by obtaining the power from Power over Ethernet (PoE), mains electricity, or other power source. There is a total power consumption limitation in the camera 10, and the total power consumption limitation is a default power consumption value or a total power upper bound provided by an external power source of the camera 10. For example, the total power upper bound of IEEE 802.3af standard of PoE is 12.95 watt per port, and the total power upper bound of IEEE 802.3at standard of PoE is 25.5 watt per port. When the power of the camera 10 is provided by the PoE of IEEE 802.3af standard, the total power consumption of the camera 10 is 12.95 watt.

Taking the camera 10 connecting to PoE in IEEE 802.3at standards for example, the default power threshold corresponds to the total power upper bound provided by PoE. In other words, the default power threshold is the total power upper bound provided by PoE minus the operation power of other components of the camera 10 not including the operation unit. For the camera 10 only including the thermal sensor 17, the image sensor 15, the control unit 19, and the operation unit 13, the default power threshold is 12.95 watt minus the operation powers of the thermal sensor 17, the image sensor 15, and the control unit 19. However, in practice, the total power consumption of the camera 10 does not exceed the total power upper bound of the external power supply and is lower than the total power upper bound, such as 90% of the total power upper bound. The embodiment is for illustrating but not for limiting the present disclosure. For explaining the present disclosure, the total power upper bound is a general name for unification.

In the embodiment shown in FIG. 1, the image sensor 15 is electrically connected to the control unit 19 to send the operation power of the image sensor 15 to the control unit 19, so that the control unit 19 dynamically adjusts the power upper bound of the monitoring power according to the operation power of the image sensor 15. For example, when the control unit 19 controls the sum of the monitoring power of the camera 10 and the operation power of the image sensor 15 to be close to but not greater than the default power threshold, the determination of the monitoring power upper bound changes according to the image sensor 15. When the operation power of the image sensor 15 is greater, the monitoring power upper bound is smaller. On the contrary, when the operation power of the image sensor 15 is smaller, the power upper bound of the monitoring power is greater.

Another way to determine the monitoring power upper bound is to limit the power upper bound of the image sensor 15 to a specific range, and the remaining available power value is set to the maximum available power for the monitoring power. For example, when the default power threshold is the total power upper bound provided by the external power supply and the total power upper bound is assumed to be 25.5 watt, 6 watt is supplied to the thermal sensor 17, and the control unit 19 in default and 10 watt is supplied to the image sensor 15, and the left 9.5 watt is the maximum available power for the monitoring power. At the same time, the image sensor 15 is able to be not connected to the control unit 19 and the monitoring power does not change according to the operation power of the image sensor 15. The present embodiment is for illustrating but not for limiting the present disclosure.

The first default temperature threshold is in association with the temperature limitation of each component in the housing space. The temperature limitation is the temperature range for the components to operate safely. Taking the housing space in which the image sensor 15, the thermal sensor 17, the operation unit 13, and the control unit 19 installed for example, among the image sensor 15, the operation unit 13, and the control unit 19, the image sensor 15 has the smallest temperature limitation. Therefore, the upper bound of the temperature limitation of the image sensor 15 is taken as the first default temperature threshold. The first default temperature threshold is taken as the maximum temperature limitation for the camera 10 to operate safely. The sensing temperature measured by the thermal sensor 17 is compared with the first default temperature threshold to control the temperature of the housing space of the camera 10 not to be greater than the first default temperature threshold.

The first default temperature threshold is a temperature value or a temperature interval. For example, when the first default temperature threshold is a temperature value and the sensing temperature is greater than the first default temperature threshold, the control unit 19 reduces the operation power of the operation unit 13 to make the sensing temperature lower than the first default temperature threshold. However, when the first default temperature threshold is a temperature interval and the sensing temperature reaches the lower bound of the temperature interval, the control unit 19 gradually controls the operation power of the operation unit 13 to create a buffer range for the control unit 19 to control the operation unit 13 before the sensing temperature decreases. The first default temperature threshold is not limited to a temperature value or a temperature interval in the present disclosure. In practice, the first default temperature and the default power threshold are better designed to an interval respectively. In the following embodiments, the first default temperature threshold and the default power threshold are designed to intervals for explanations.

Figure 3:
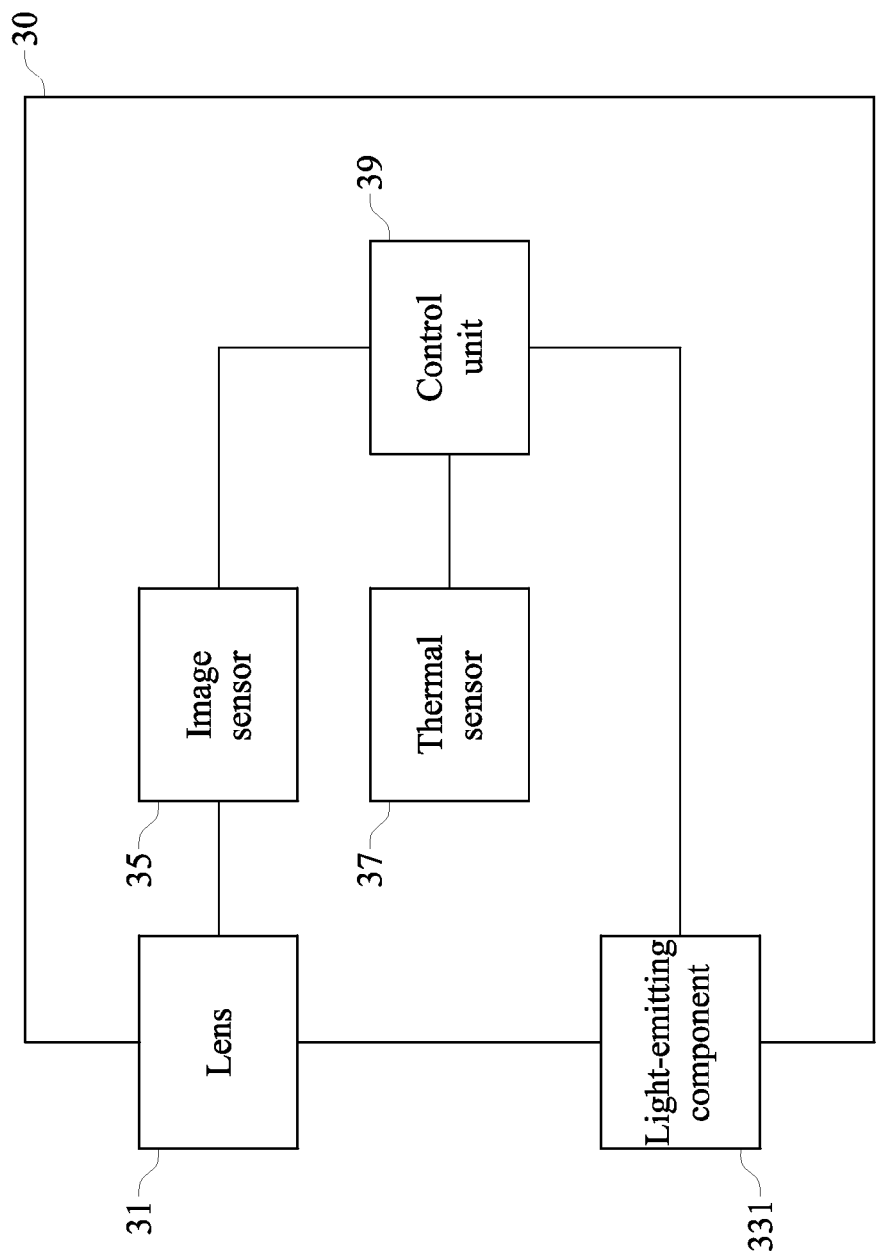
FIG. 3 is a block diagram of the camera according to the second embodiment.
Figure 4:
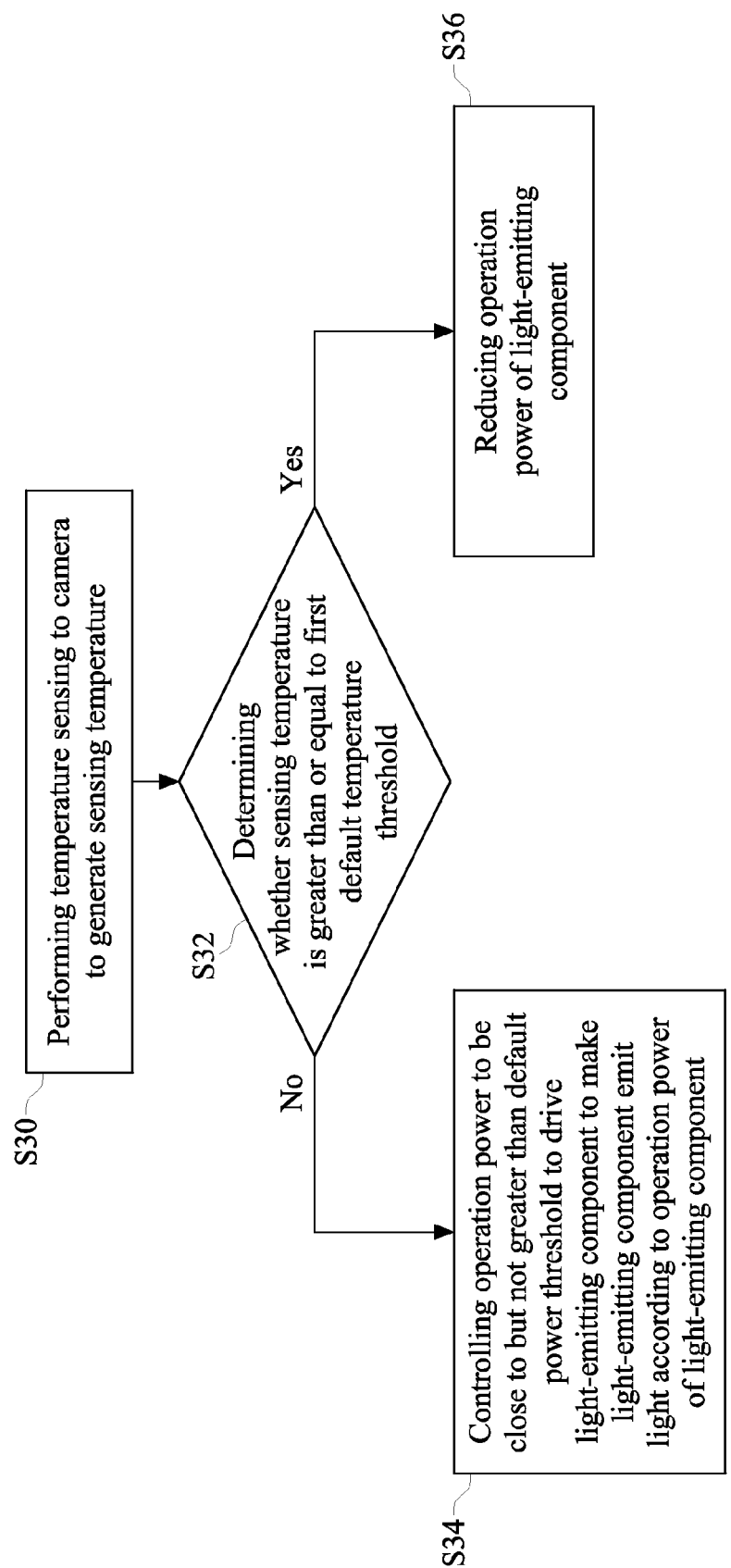
FIG. 4 is a flow chart of the camera control method according to the second embodiment.

Please refer to FIG. 3 and FIG. 4 together. FIG. 3 is a block diagram of the camera according to the second embodiment. FIG. 4 is a flow chart of the camera control method according to the second embodiment. As shown in the figures, the camera 30 includes a lens 31 installed on the case and at least one operation unit, at least one image sensor 35, at least one thermal sensor 37, and at least one control unit 39, wherein the at least one operation unit, the at least one image sensor 35, the at least one thermal sensor 37, and the at least one control unit 39 are installed inside the case. The lens 31, the image sensor 35, the thermal sensor 37, and the control unit 39 in the present embodiment are similar to those in the previous embodiment. The difference between the present embodiment and the previous embodiment is that the operation unit is set to a light-emitting component 331. The light-emitting component 331 includes a plurality of light emitting sources and a driving unit for driving the plurality of light emitting sources. The plurality of light emitting sources are, but not limited to, light-emitting diodes (LEDs), infrared LEDs (IRLEDs), laser LEDs, or other components capable of emitting light. The plurality of light emitting sources are installed in the outer lateral of the lens 31 and are for emitting light towards the field of view of the lens 31 to compensate the brightness. The monitoring power is the operation power of the light-emitting component 331, and the default power threshold is the power upper bound of the corresponding light-emitting component 331.

When the camera 30 is operating, in the step S30, the camera 30 performs temperature sensing with the thermal sensor 37 to generate the sensing temperature. In the step S32, the sensing temperature is compared with the first default temperature threshold. When the sensing temperature is less than the first default temperature threshold, the step S34 is executed, and the control unit 39 controls the operation power of the light-emitting component 331 to be close to but not greater than the default power threshold to drive the light-emitting component 331, so that the light-emitting component 331 has larger light emitting power to provide stronger light compensation effect. In this step, when the current operation power of the light-emitting component 331 is close to the default power threshold, the control unit 39 maintains the operation power to the current level, and when there is still a gap between the current operation power of the light-emitting component 331 and the default power threshold, the control unit 39 increases the operation power to be close to but not greater than the default power threshold. When the sensing temperature is greater than or equal to the first default temperature threshold, the step S36 is executed and the control unit 39 reduces the operation power of the light-emitting component 331 to reduce the heat generated by the light-emitting component 331, so that the sensing temperature in the housing space of the camera 30 is reduced. Therefore, exceeding the temperature limitation of the image sensor 35 in the housing space and the malfunction problem of the image sensor 35 due to overheat are avoided.

Figure 5:
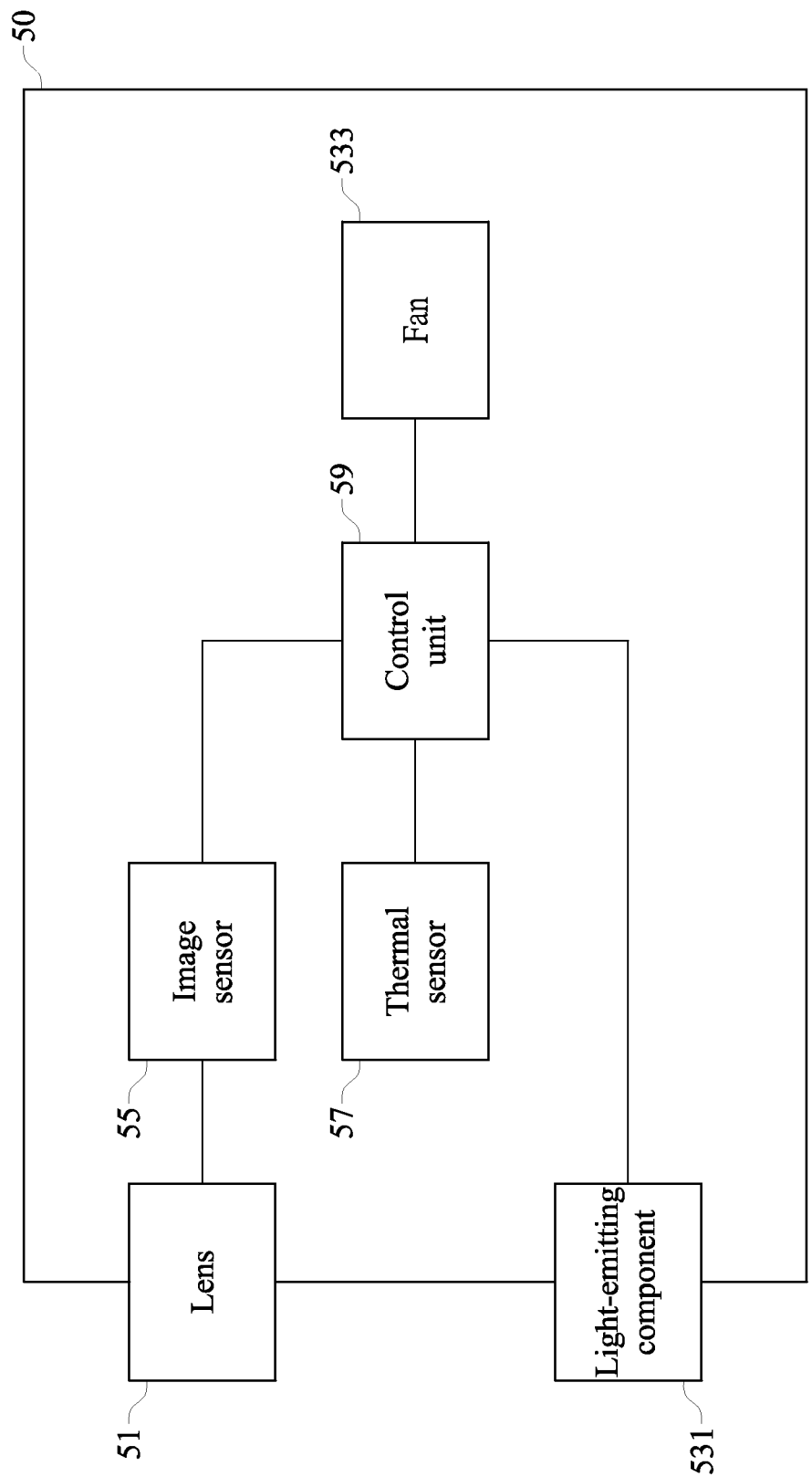
FIG. 5 is a block diagram of the camera according to the third embodiment.
Figure 6:
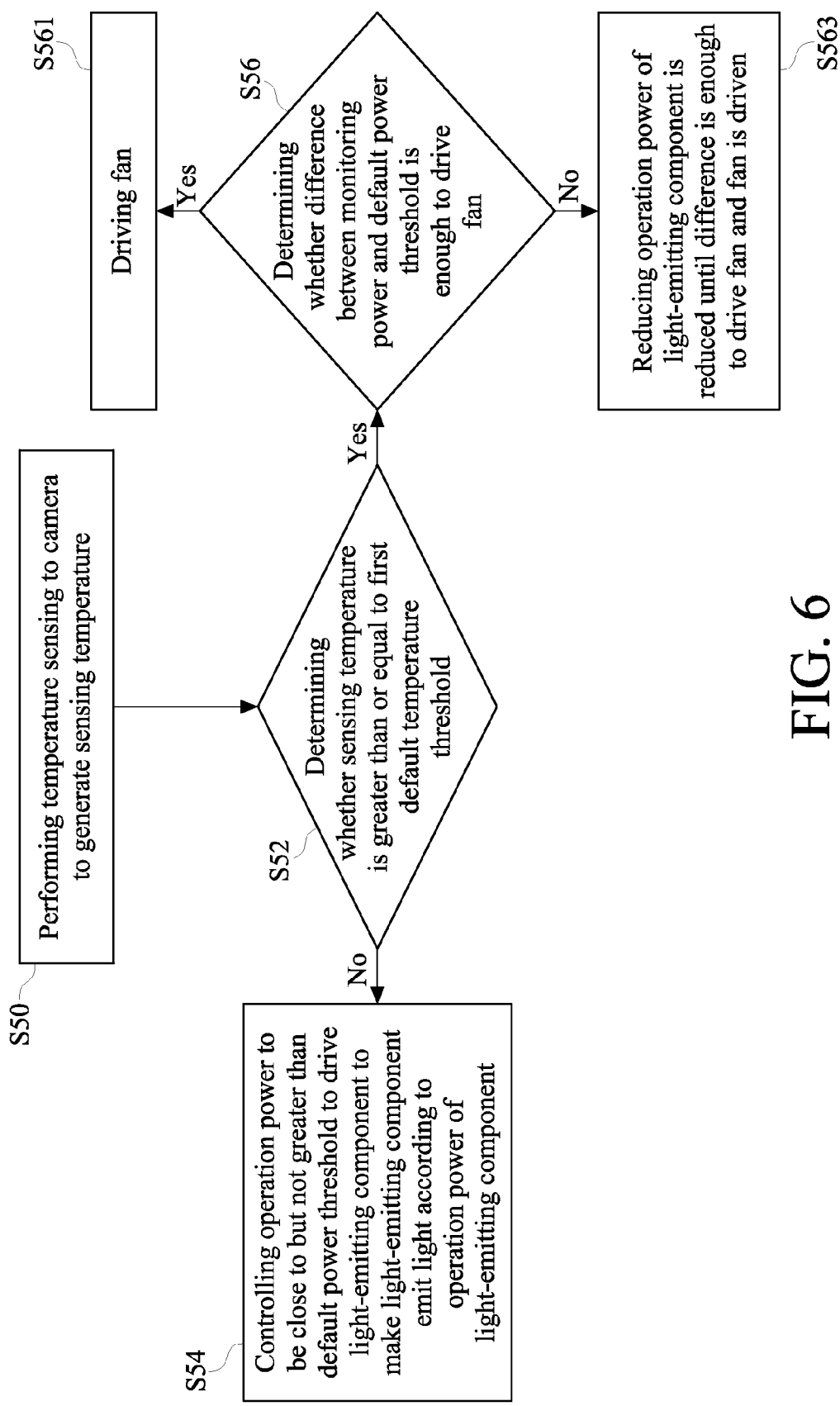
FIG. 6 is a flow chart of the camera control method according to the third embodiment.

Please refer to FIG. 5 and FIG. 6. FIG. 5 is a block diagram of the camera according to the third embodiment. FIG. 6 is a flow chart of the camera control method according to the third embodiment. As shown in the figures, in the third embodiment, the camera 50 includes a lens 51 installed on the case and at least one operation unit, at least one image sensor 55, at least one thermal sensor 57, and at least one control unit 59. The lens 51, the image sensor 55, the thermal sensor 57, and the control unit 59 in the present embodiment are almost the same as the lens 11, the image sensor 15, the thermal sensor 17, and the control unit 19 in the first embodiment. In the third embodiment, the at least two operation unit includes two operation units and the two operation units are a light-emitting component 531 and a fan 533. The light-emitting component 531 is almost the same as the light-emitting component 331 in the second embodiment. The fan 533 is installed inside the housing space for heat dissipation to reduce the temperature of the housing space. In the present embodiment, the monitoring power is the sum of the operation power of the light-emitting component 531 and the operation power of the fan 533. The default power threshold corresponds to the power upper bound of the fan 533 and the light-emitting component 531.

In the step S50, the camera 50 performs the temperature sensing with the thermal sensor 57 to generate the sensing temperature. In the step S52, the sensing temperature is compared with the first default temperature threshold. When the sensing temperature is less than the first default temperature threshold, the step S54 is executed and the control unit 59 controls the operation power of the light-emitting component 531 to be close to but not greater than the default power threshold to drive the light-emitting component 531. Therefore, the light-emitting component 531 has a greater light emitting power to provide stronger light compensation effect. When the sensing temperature is greater than or equal to the first default temperature threshold, the step S56 is executed to compare the monitoring power with the default power threshold. When the monitoring power is not greater than the default power threshold and the difference between the monitoring power and the default power threshold is enough to drive the fan 533, the step S561 is executed to drive the fan 533 for heat dissipation. When the monitoring power is not greater than the default power threshold but the difference between the monitoring power and the default power threshold is not enough to drive the fan 533, the step S563 is executed to reduce the operation power of the light-emitting component 531. The fan 533 is driven for heat dissipation until the difference between the monitoring power and the default power threshold is enough to drive the fan 533.

In addition to the turn on and turn off function, the fan 533 further has a function of controlling the rotation speed. When the operation power of the fan 533 is higher, the rotation speed of the fan 533 is faster and the heat dissipation effect is better. When the operation power of the fan 533 is lower, the rotation speed of the fan 533 is slower and the heat dissipation effect is worse. In the step S563, the operation power of the light-emitting component 531 is reduced and the control unit drives the fan 533 when the difference is enough to drive the fan 533 to operate in low rotation speed. The operation power of the light-emitting component 531 is further gradually reduced and the reduced operation power of the light-emitting component 531 is offered to the fan 533 to speed up the rotation speed of the fan 533.

In addition, after the fan 533 is driven, when the sensing temperature is less than the first default temperature threshold, the control unit 59 preferentially but not necessarily increases the operation power of the light-emitting component 531 and gradually decreases the operation power of the fan 533. The fan 533 is turned off until the sensing temperature is maintained to be less than the first default temperature threshold.

Figure 7:
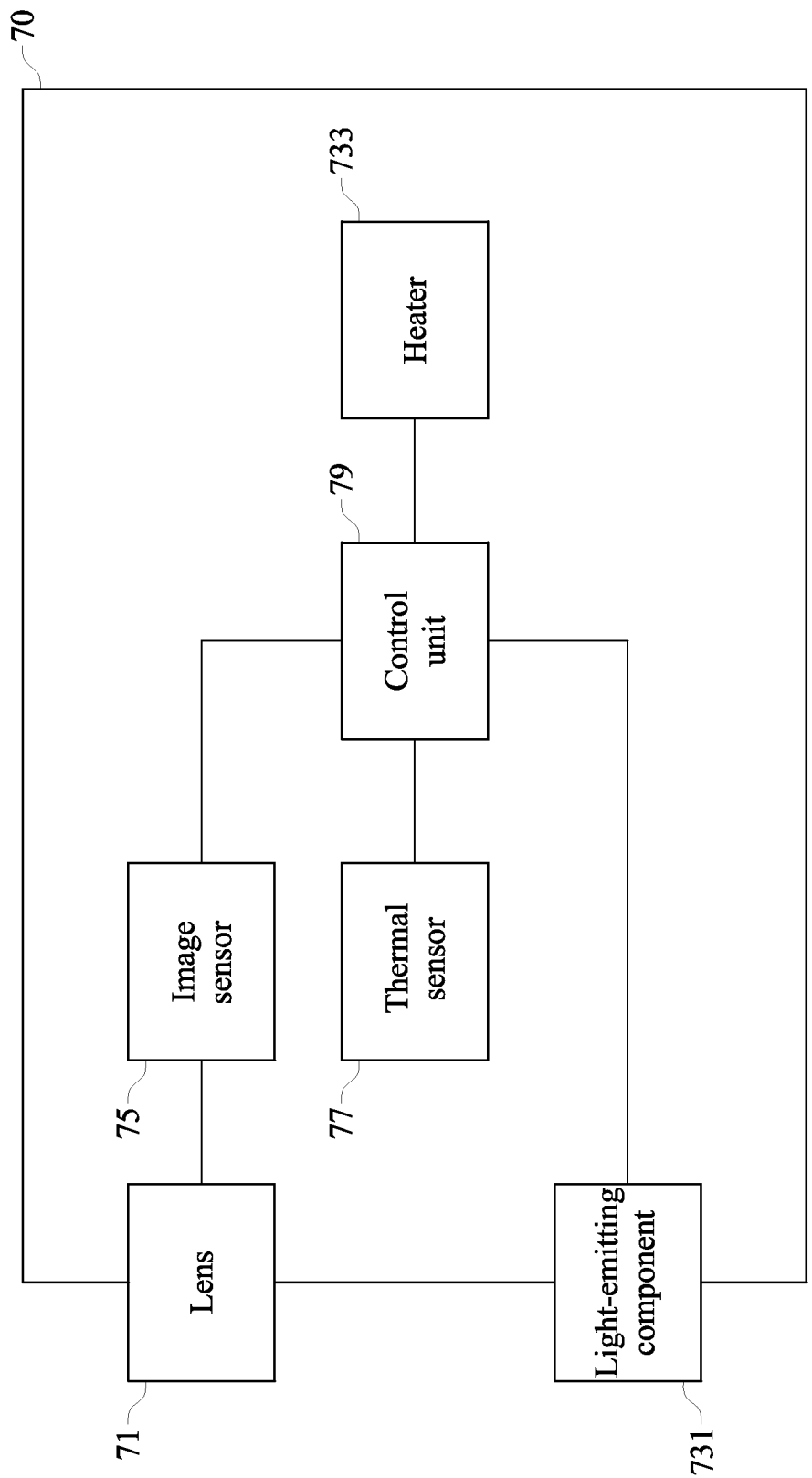
FIG. 7 is a block diagram of the camera according to the fourth embodiment.
Figure 8:
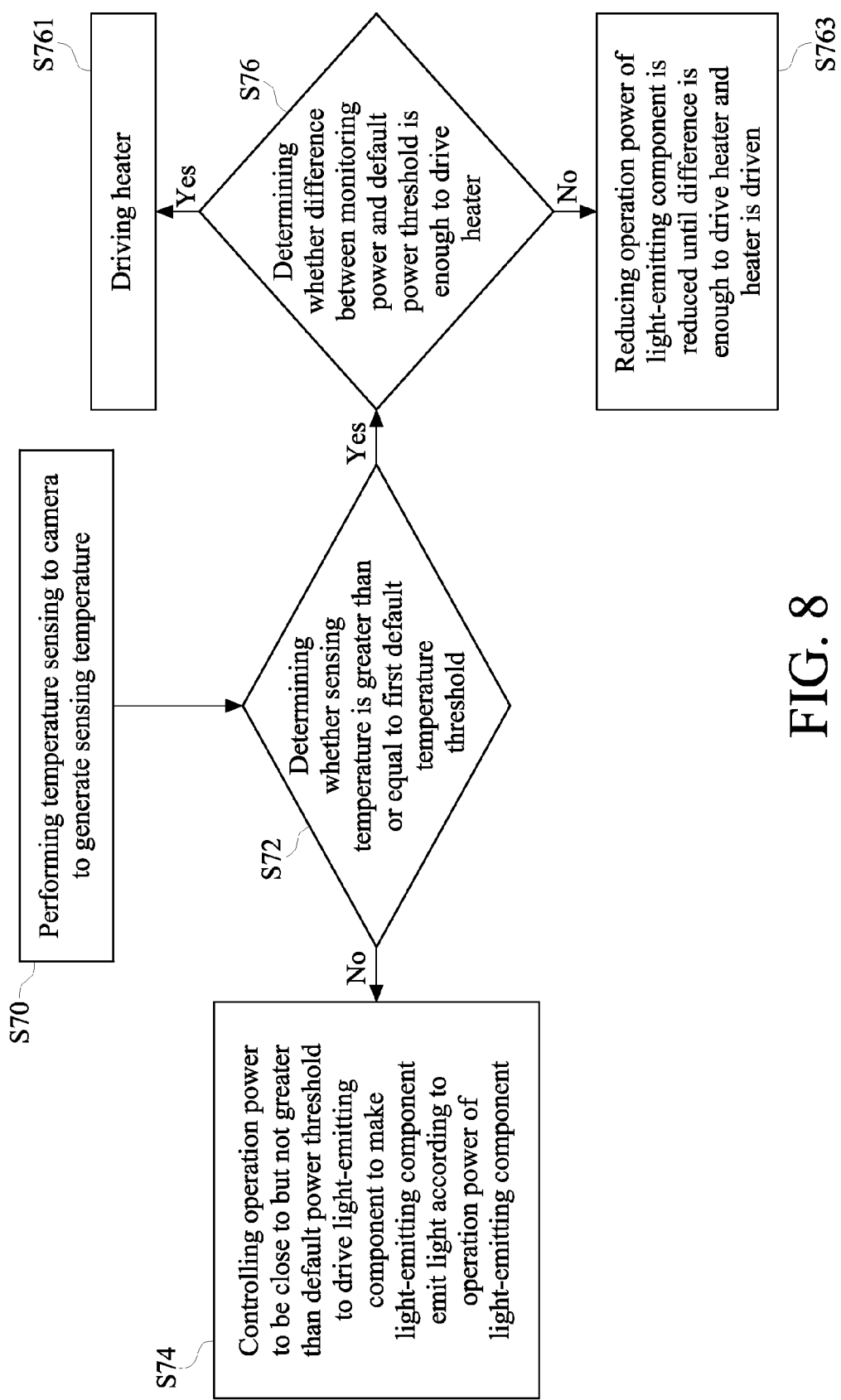
FIG. 8 is a flow chart of the camera control method according to the fourth embodiment.

Please refer to FIG. 7 and FIG. 8. FIG. 7 is a block diagram of the camera according to the fourth embodiment. FIG. 8 is a flow chart of the camera control method according to the fourth embodiment. As shown in the figures, the fourth embodiment is similar to the third embodiment and the camera 70 includes a lens 71 installed on the case and at least one operation unit, at least one image sensor 75, at least one thermal sensor 77, and at least one control unit 79 installed inside the case. The at least one operation unit includes two operation units which are the light-emitting component 731 and the heater 733. The light-emitting component 731 in the present embodiment is almost the same as the light-emitting component 331 in the second embodiment and the light-emitting component 531 in the third embodiment, and is not further explained hereinafter. The heater 733 is for controlling the temperature inside the case of the camera 70, so that the internal temperature of the camera 70 is still maintained in a better operating temperature when the camera 70 is in a freezing environment. The camera 70 does not work abnormally when the temperature is extremely low.

In the present embodiment, the heater 733 is mainly for maintain the temperature of the housing space to be higher than a specific temperature. Comparing to the first default temperature threshold, the specific temperature is specified as the second default temperature threshold which is the lower bound of the temperature limitation for the components in the housing space to operate normally, and the second default temperature threshold is lower than the first default temperature threshold. For example, the image sensor 75 has not only a lower temperature limitation upper bound for safe operation but also a higher temperature limitation lower bound for steady operation. In other words, the temperature specification range of the image sensor 75 for safe and steady operation is narrower. Therefore, in the present disclosure, the first default temperature threshold and the second default temperature threshold are, but not limited to, both in association with the temperature limitation range of the image sensor 75.

In the fourth embodiment, the monitoring power of the camera 70 is the sum of the operation power of the light-emitting component 731 and the operation power of the heater 733. The default power threshold corresponds to the power upper bound of the light-emitting component 731 and the heater 733.

In the step S70, the camera 70 performs the temperature sensing with the thermal sensor 77 to generate the sensing temperature. In the step S72, the sensing temperature is compared with the second default temperature threshold. When the sensing temperature is greater than the second default temperature threshold, the step S74 is executed. The control unit 79 controls the operation power of the light-emitting component 731 to be close to but not greater than the default power threshold to drive the light-emitting component 731, so that the light-emitting component 731 has a greater light emitting power to provide stronger light compensation effect. When the sensing temperature is less than or equal to the second default temperature threshold, the step S76 is executed to compare the monitoring power with the default power threshold. When the monitoring power is not greater than the default power threshold and the difference between the monitoring power and the default power threshold is enough to drive the heater 733, the step S761 is executed to drive the heater 733, so that the sensing temperature exceeds the second default temperature threshold. When the monitoring power is not greater than the default power threshold but the difference between the monitoring power and the default power threshold is not enough to drive the heater 733, the step S763 is executed to reduce the operation power of the light-emitting component 731. The heater 733 is driven until the difference between the monitoring power and the default power threshold is enough to drive the heater 733.

In the present embodiment, the light-emitting component 731 and the heater 733 are the components that generate heat when operating. However, in the environment with extreme low temperature, the light-emitting component 731 still generates heat to increase the temperature in the housing space but the heat is not enough to make the sensing temperature greater than the second default temperature threshold. Furthermore, the operation power of the light-emitting component 731 can have a power upper bound of safe operation. Therefore, when the operation power of the light-emitting component 731 reaches in the power upper bound or the monitoring power reaches the default power threshold and the temperature of the housing space is not greater than the second default temperature threshold, the control unit 79 drives the heater 733 to maintain the internal temperature of the housing space to make the camera operate steadily and safely.

According to the third embodiment and the fourth embodiment, the camera of the present disclosure is the combination of the light-emitting component, the fan, and the heater. The camera has wider applicable range and environment.

Figure 9:
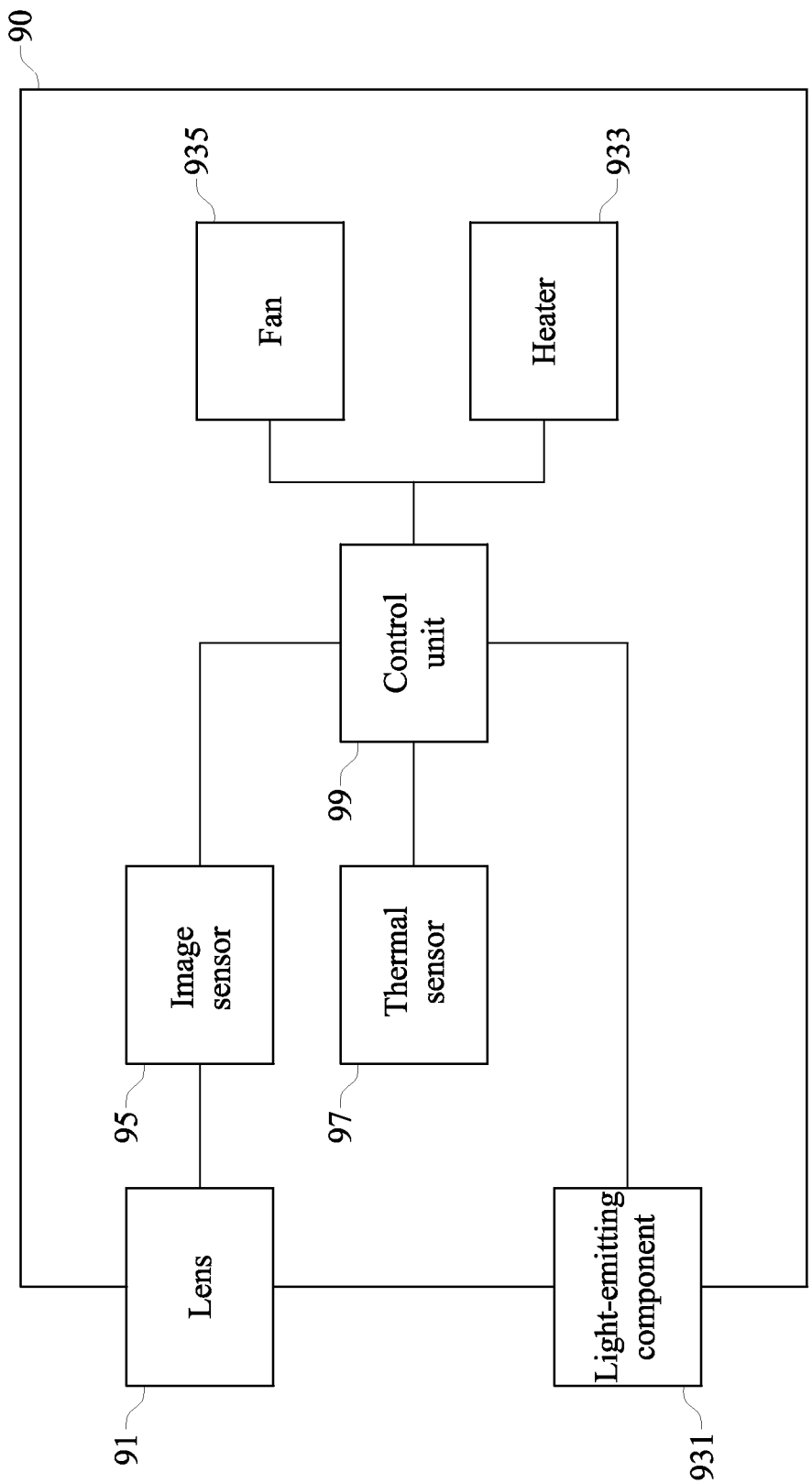
FIG. 9 is a block diagram of the camera according to the fifth embodiment.
Figure 10:
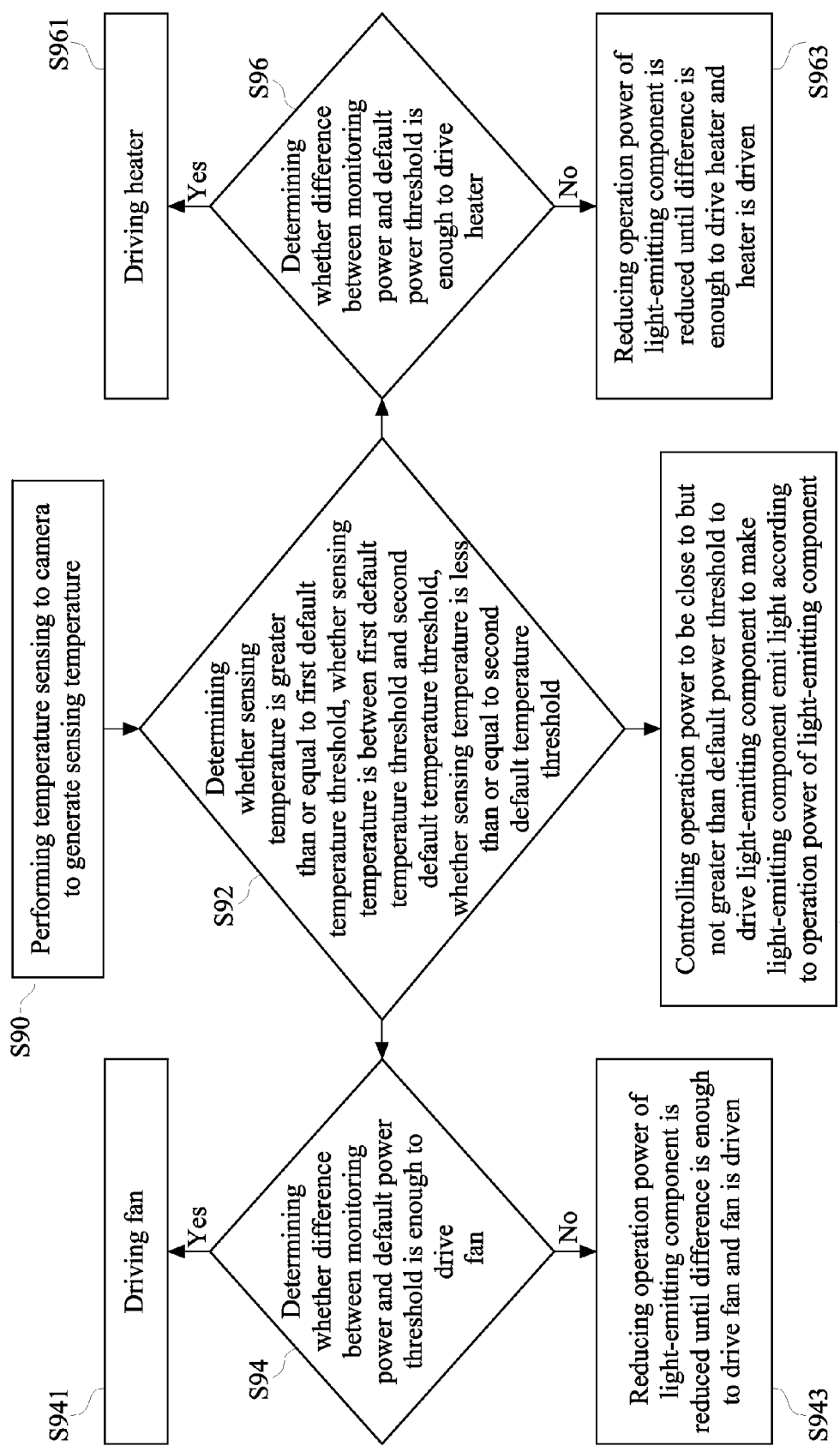
FIG. 10 is a flow chart of the camera control method according to the fifth embodiment.

Please refer to FIG. 9 and FIG. 10. FIG. 9 is a block diagram of the camera according to the fifth embodiment. FIG. 10 is a flow chart of the camera control method according to the fifth embodiment. As shown in the figures, similar to the camera 70 in the fourth embodiment, the camera 90 in the fifth embodiment also includes a lens 91 installed on the case, at least one operation unit installed inside the case, an image sensor 95, a thermal sensor 97, and a control unit 99. The at least one operation unit is the light-emitting component 931, the fan 933, and the heater 935. The light-emitting component 931, the fan 933, and the heater 935 in the present embodiment are almost the same as the light-emitting component 331, 531, 731, the fan 533, and the heater 733, and are not further explained hereinafter.

In the present embodiment, the monitoring power is the sum of the operation power of the light-emitting component 931, the operation power of the fan 933, and the operation power of the heater 935. The default power threshold corresponds to the power upper bound of the light-emitting component 931, the fan 933, and the heater 935.

In the step S90, the camera performs temperature sensing using the thermal sensor 97 to generate the sensing temperature. In the step S92, the relationships between the sensing temperature, the first default temperature threshold, and the second default temperature threshold are determined by comparing.

When the sensing temperature is between the first default temperature threshold and the second default temperature threshold, the step S921 is performed. The control unit 99 controls the operation power of the light-emitting component 931 to be close to but not greater than the default power threshold to drive the light-emitting component 931, so that the light-emitting component 931 has a greater light emitting power to provide stronger light compensation effect.

When the sensing temperature is greater than or equal to the first default temperature threshold, the step S94 is performed to compare the monitoring power with the default power threshold.

In the step S941, when the monitoring power is not greater than the default power threshold and the difference between the monitoring power and the default power threshold is enough to drive the fan 933, the fan 933 is driven.

In the step S943, when the monitoring power is not greater than the default power threshold but the difference between the monitoring power and the default power threshold is not enough to drive the fan 933, the operation power of the light-emitting component 931 is reduced. The fan 933 is driven until the difference between the monitoring power and the default power threshold is enough to drive the fan 933.

When the sensing temperature is less than or equal to the second default temperature threshold, the step S96 is executed to compare the monitoring power with the default power threshold.

In the step S961, when the monitoring power is not greater than the default power threshold and the difference between the monitoring power and the default power threshold is enough to drive the heater 935, the heater 935 is driven.

In the step S963, when the monitoring power is not greater than the default power threshold but the difference between the monitoring power and the default power threshold is not enough to drive the heater 935, the operation power of the light-emitting component 931 is reduced. The heater 935 is driven until the difference between the monitoring power and the default power threshold is enough to drive the heater 935.

The aforementioned embodiments are for illustrating but not for limiting the present disclosure. Modifying the details or forms of the present disclosure by persons skilled in the art without violating the spirit of the present disclosure is trivial and obvious.

For example, when the sensing temperature is equal to the first default temperature threshold, executing the step of which the sensing temperature is greater than the first default temperature threshold or executing the step of which the sensing temperature is less than the first default temperature threshold is a simple variation of the present disclosure.

In addition to the lens and the image sensor, the camera at least includes a thermal sensor, at least one operation unit, and a control unit. By measuring the internal temperature of the camera by the thermal sensor, especially the temperature of the image sensor, the operation powers of other operation units are controlled to adjust the operation power of the operation unit. When the camera control method is adapted to the infrared camera with a light-emitting component, the operation power of the light-emitting component does not limit the light compensation effect due to the temperature specification of the image sensor. Instead, the light-emitting component is controlled to be operating in a higher operation power to enhance the light compensation effect according to the current condition of the camera when the image sensor is ensured not to be malfunctioned.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A camera, comprising:
    a lens;
    at least one operation unit actuating according to at least one operation power correspondingly;
    an image sensor for receiving images from the lens;
    a thermal sensor for performing temperature sensing and outputting a sensing temperature; and
    wherein an amount of the at least one operation power is controlled to make a first monitoring power owned by the camera close to but not greater than a default power threshold, and to make the sensing temperature not greater than a first default temperature threshold, wherein the first monitoring power is the sum of the at least one operation power and the sensing temperature corresponds to the at least one operation power;
    wherein the at least one operation unit includes a light-emitting component and a fan, and the light-emitting component and the fan actuate according to the respective operation power correspondingly, and the default power threshold corresponds to a power upper bound of the light-emitting component and the fan, and the first monitoring power is the sum of the operation power of the fan and the operation power of the light-emitting component, and when the sensing temperature is less than the first default temperature threshold, the operation power of the light-emitting component is controlled to make the first monitoring power close to but not greater than the power upper bound;
    when the sensing temperature is greater than or equal to the first default temperature threshold and a difference between the first monitoring power and the default power threshold is enough to drive the fan, the fan is driven; when the sensing temperature is greater than or equal to the first default temperature threshold and the difference between the first monitoring power and the default power threshold is not enough to drive the fan, the fan is driven at which the operation power of the light-emitting component is reduced to the difference for driving the fan.

2. The camera of claim 1, wherein the at least one operation unit is selected from the group consisting of a light-emitting component, a fan, a heater, and combination thereof, and the light-emitting component, the fan, and the heater actuate according to respective operation power correspondingly.

3. The camera of claim 1, wherein the light-emitting component emits light the default power threshold corresponds to a power upper bound of the light-emitting component, and a monitoring power is the operation power of the light-emitting component, and when the sensing temperature is less than the first default temperature threshold, the operation power of the light-emitting component is controlled to be close to but not greater than the default power threshold to drive the light-emitting component, and when the sensing temperature is greater than or equal to the first default temperature threshold, the operation power of the light-emitting component is reduced.

4. The camera of claim 1, wherein the at least one operation unit further includes a heater, and the light-emitting component and the heater actuate according to the respective operation power correspondingly, and the default power threshold corresponds to a power upper bound of the light-emitting component and the heater, and a third monitoring power is the sum of the operation power of the heater and the operation power of the light-emitting component, and when the sensing temperature is less than a second default temperature threshold, the operation power of the light-emitting component is controlled to make the third monitoring power close to but not greater than the power upper bound to drive the light-emitting component, and the second default temperature threshold is less than the first default temperature threshold.

5. The camera of claim 4, wherein when the sensing temperature is less than the second default temperature threshold and a difference between the third monitoring power and the default power threshold is enough to drive the heater, the heater is driven; when the sensing temperature is greater than or equal to the second default temperature threshold and the difference between the third monitoring power and the default power threshold is not enough to drive the heater, the heater is driven at which the operation power of the light-emitting component is reduced to the difference for driving the heater.

6. The camera of claim 1, wherein the default power threshold corresponds to a total power upper bound provided by Power over Ethernet (PoE).

7. A camera control method for a camera having at least one operation unit, the at least one operation unit actuating according to at least one operation power correspondingly, the camera control method comprising:
    performing temperature sensing to the camera to generate a sensing temperature; and
    controlling an amount of the at least one operation power to make a first monitoring power owned by the camera close to but not greater than a default power threshold, and to make the sensing temperature not greater than a first default temperature threshold, wherein the first monitoring power is the sum of the at least one operation power and the sensing temperature corresponds to the at least one operation power;
    wherein the at least one operation unit includes a light-emitting component and a fan, and the default power threshold corresponds to a power upper bound of the light-emitting component and the fan, and the first monitoring power is the sum of the operation power of the fan and the operation power of the light-emitting component, and the step of controlling an amount of the at least one operation power comprises:
        comparing the sensing temperature with the first default temperature threshold; and
        when the sensing temperature is less than the first default temperature threshold, controlling the operation power to be close to but not greater than the default power threshold to drive the light-emitting component to make the light-emitting component emit light according to the operation power of the light-emitting component;
        when the sensing temperature is greater than or equal to the first default temperature threshold, the first monitoring power is compared with the default power threshold,
        when the first monitoring power is not greater than the default power threshold and a difference between the first monitoring power and the default power threshold is enough to drive the fan, the fan is driven; and
        when the first monitoring power is close to but not greater than the default power threshold and the difference between the first monitoring power and the default power threshold is not enough to drive the fan, the operation power of the light-emitting component is reduced until the difference is enough to drive the fan and the fan is driven.

8. The camera control method of claim 7, wherein the default power threshold corresponds to a power upper bound of the light-emitting component, and a second monitoring power is the operation power of the light-emitting component, and the step of controlling an amount of the at least one operation power comprises:
    comparing the sensing temperature with the first default temperature threshold;
    when the sensing temperature is less than the first default temperature threshold, controlling the operation power of the light-emitting component to be close to but not greater than the default power threshold to drive the light-emitting component to make the light-emitting component emit light according to the operation power of the light-emitting component; and
    when the sensing temperature is greater than or equal to the first default temperature threshold, reducing the operation power of the light-emitting component.

9. A camera control method for a camera having at least one operation unit, the at least one operation unit actuating according to at least one operation power correspondingly, the camera control method comprising:
    performing temperature sensing to the camera to generate a sensing temperature; and
    controlling an amount of the at least one operation power to make a first monitoring power owned by the camera close to but not greater than a default power threshold, and to make the sensing temperature not greater than a first default temperature threshold, wherein the first monitoring power is the sum of the at least one operation power and the sensing temperature corresponds to the at least one operation power;

wherein the at least one operation unit includes a light-emitting component and a heater, and the default power threshold corresponds to a power upper bound of the light-emitting component and the heater, and the first monitoring power is the sum of the operation power of the light-emitting component and the operation power of the heater, and the step of controlling the operation power comprises:
  comparing the sensing temperature with a second default temperature threshold, the second default temperature threshold less than the first default temperature threshold;
  when the sensing temperature is between the first default temperature and the second default temperature threshold, controlling the operation power of the light-emitting component to make the first monitoring power close to but not greater than the default power threshold to drive the light-emitting component to emit light according to the operation power of the light-emitting component;
  when the sensing temperature is less than or equal to the second default temperature threshold, comparing the first monitoring power with the default power threshold;
  when the first monitoring power is not greater than the default power threshold and a difference between the first monitoring power and the default power threshold is enough to drive the heater, the heater is driven; and
  when the first monitoring power is close to but not greater than the default power threshold and the difference between the first monitoring power and the default power threshold is not enough to drive the heater, the operation power of the light-emitting component is reduced to the difference for driving the heater and the heater is driven.

10. The camera control method of claim 7, wherein the default power threshold corresponds to a total power upper bound provided by Power over Ethernet (PoE).

11. The camera control method of claim 9, wherein the default power threshold corresponds to a power upper bound of the light-emitting component, and a third monitoring power is the operation power of the light-emitting component, and the step of controlling an amount of the at least one operation power comprises:
  comparing the sensing temperature with the first default temperature threshold;
  when the sensing temperature is less than the first default temperature threshold, controlling the operation power of the light-emitting component to be close to but not greater than the default power threshold to drive the light-emitting component to make the light-emitting component emit light according to the operation power of the light-emitting component; and
  when the sensing temperature is greater than or equal to the first default temperature threshold, reducing the operation power of the light-emitting component.

12. The camera control method of claim 9, wherein the default power threshold corresponds to a total power upper bound provided by Power over Ethernet (PoE).

* * * * *